United States Patent Office 3,342,738
Patented Sept. 19, 1967

3,342,738
CALCINING PROCESSES AND PRODUCTS RESULTING THEREFROM
Chung Yu Shen, Olivette, Mo., assignor to Monsanto Company, a corporation of Delaware
No Drawing. Filed Aug. 12, 1963, Ser. No. 301,643
10 Claims. (Cl. 252—135)

The present invention relates to calcining processes for the manufacture of alkali metal trimetaphosphate compositions. More particularly, the present invention relates to calcining processes involving the use of mixtures of alkali metal sulfates with alkali metal phosphates in calcining processes to produce alkali metal trimetaphosphate products that are practically free of insoluble metaphosphates, and to the new and useful products resulting therefrom.

Ordinarily it is a very difficult and expensive task for manufacturers of inorganic phosphates to produce alkali metal trimetaphosphate products (which, for example, contain more than about 15 weight percent of the trimetaphosphate) that are essentially free of materials which are insoluble in water (called "insoluble metaphosphates" or for convenience herein "IMP"). However it is just such practically completely water-soluble trimetaphosphates that are in greatest demand today; especially for use in the laundry detergent business. Consequently, phosphate manufacturers have been searching for an improved process whereby completely water-soluble alkali metal trimetaphosphate products can be manufactured conveniently and economically. Applicants have found that when orthophosphate "raw" materials for the production of alkali metal trimetaphosphates (such as sodium trimetaphosphate) are calcined in the presence of an effective amount of an alkali metal sulfate such as sodium sulfate ($Na_2SO_4$) under otherwise under otherwise conventional calcining conditions (where ordinarily it would be expected that at least several percent of IMP would be produced in the resulting trimetaphosphate product) surprisingly, essentially no IMP can be found.

The products immediately resulting from the calcining processes of this invention are chemically uniform blends containing alkali metal sulfate and alkali metal trimetaphosphate. They can be utilized to particular advantage either directly, in that form, in the processes for the manufacture of laundry detergent compositions, for example, in which detergent processes the trimetaphosphate is converted, by interreaction with a strong base, into a tripolyphosphate. Light density products that consist essentially of alkali metal sulfate and hydrated alkali metal tripolyphosphate (for which products there is also a great need in the detergent industry) can be manufactured, if desired, via a process whereby the trimetaphosphate is converted to the hydrated tripolyphosphate in a concentrated aqueous slurry under conditions such that the slurry is in the form of a very light density foam while the hydrated tripolyphosphate is crystallized from the slurry.

While the "raw" materials that are initially charged into the calciner feed stream in the calcining phase of the overall processes of the present invention can contain as little as two weight percent or even less, generally they should contain at least about 5 weight percent, and can contain up to as much as about 70% or more, of one or more alkali metal sulfates. Otherwise, the feed streams can be the same as those conventionally employed in the manufacture of alkali metal trimetaphosphates. For example, although the remainder (other than the alkali metal sulfate) of the raw material feed stream to the calciner should consist of at least about 70 weight percent of an appropriate alkali metal phosphate "raw" material or phosphate salt blend that can be converted to alkali metal trimetaphosphate in the calciner, it should preferably contain at least about 95 weight percent of the appropriate phosphate salt(s), so that the product resulting from the calcination of this "raw" material will be a relatively pure blend of the alkali metal sulfate and substantially water-soluble alkali metal condensed phosphates; especially trimetaphosphate. Preferably, the weight ratio of alkali metal sulfate to the total alkali metal phosphate in the calciner feed stream should be between about 1:10 and about 3:2, respectively. Still further preferred "raw" materials for the calciner feed stream are mixtures or blends containing alkali metal sulfate and an appropriate alkali metal phosphate salt or salt blend in weight ratios of sulfate to total phosphate, respectively, of from about 1:5 to about 1:1.

The term "appropriate alkali metal phosphate salt" or "appropriate alkali metal phosphate salt blend" in the foregoing discussion is intended to encompass practically any inorganic alkali metal phosphate salt or salt blend that is substantially completely soluble in water to the extent of at least about 1 weight percent. It is preferred, for example, that at least one of the "raw" phosphate salts in the calciner feed streams contain some water of constitution (as distinguished from water of hydration). Examples of the wide variety of inorganic phosphate salts that can be utilized as part of the "raw" materials (that are calcined in the practice of this invention) include, but are not limited to, monosodium dihydrogen orthophosphate, disodium monohydrogen orthophosphate, monopotassium dihydrogen orthophosphate, dipotassium monohydrogen orthophosphate, monoammonium dihydrogen orthophosphate, diammonium monohydrogen orthophosphate, monolithium dihydrogen orthophosphate, disodium dihydrogen pyrophosphate, dipotassium dihydrogen pyrophosphate, trisodium dihydrogen tripolyphosphate, sodium hexametaphosphate, Graham's salt, and the like, including even the tri-alkali metal orthophosphates. The term "alkali metal" as utilized herein is intended to encompass such preferred alkali metal cations as lithium, sodium, and potassium, as well as ammonium cations. Other alkali metal cations such as rubidium, cesium, and francium can also be used. However, as a practical matter, their high cost generally makes their use uneconomical.

In order to produce a blend of alkali metal sulfate and alkali metal trimetaphosphate which is relatively "pure" in one embodiment of the present invention [i.e., which product (from the calciner) blend contains at most only a few weight percent of water-soluble phosphate salts other than trimetaphosphate] the ratio of M/P (where M represents an alkali metal cation excluding ammonium ion) in the phosphate salts that are utilized in the calciner feed stream should be within the range of from about 0.98 to about 1.02, and is preferably almost exactly 1.0. However, it has been discovered that the present invention is applicable, not only to the manufacture of such "pure" alkali metal sulfate-trimetaphosphate blends, but also to the manufacture of quaternary blends containing (a) alkali metal sulfate, (b) alkali metal trimetaphosphate, (c) penta alkali metal tripolyphosphate, and (d) tetra alkali metal pyrophosphate, even though the ratio of M/P of the alkali metal phosphates in the calciner feed stream is significantly lower than about 1.7, the ratio which was heretofore believed necessary in order to manufacture significant quantities of tetra alkali metal pyrophosphates via calcining techniques. Generally, it is preferred that when ever "raw" calciner material feed streams having M/P ratios higher than about 1.5 are utilized in the processes of this invention, at least about 10 weight percent of alkali metal sulfate also be utilized in these calciner feed streams.

In accordance with another embodiment of the present invention, more of the advantages of practicing the invention can be appreciated when the ratio of M/P in the phosphate portion of the "raw" calciner feed stream described above is within the range of from about 0.9 to about 1.5. However, it is generally preferred that the ratio of M/P (of the phosphate portion of the calciner feed stream) be within the range of from about 0.95 to about 1.35. Stated otherwise, the ratio of M/P in the entire calciner feed stream (after correcting for the fact that there are two molecules of alkali metal per molecule of sulfate in the alkali metal sulfate which is also present in the feed stream) can advantageously be within the overall range of from about 0.9 to about 1.7, and is preferably within the range of from about 0.95 to about 1.35, although sometimes ratios beyond the broadest of these ranges can also be effectively utilized in the practice of this invention.

The calciner feed streams can be either aqueous (in the form of a solution or a slurry) or anhydrous, containing essentially no free water, depending upon the particular calcining procedure that one desires to utilize. While some of the benefits of this invention can be obtained no matter which of the above-described "raw" phosphatic materials are utilized in the calciner feed streams, and no matter how the calciner feed streams are prepared, for optimum results it has been found that the various alkali metal phosphate salts in the calciner feed streams should be very intimately admixed so that the feed stream is a fairly uniform blend of all of these phosphate salts with the alkali metal sulfate salts when it is ultimately subjected to temperatures above about 300° C. in the calciner.

An excellent way to achieve an extremely uniform calciner feed stream is to first dissolve (or slurry) the various "raw" phosphate and sulfate materials into water, and subsequently remove most of the free water from the resulting mixture by evaporating it according to any of a number of conventional procedures (such as on a steam-heated drum dryer) prior to the calcining step of the present invention. Of course, no mixture of phosphate salts is necessary when any of the "pure" alkali metal sulfate-trimetaphosphate blends described above is to be manufactured using mixtures of alkali metal sulfate with monoalkali metal orthophosphate. Another way of achieving an extremely intimate mixture of the phosphate salts that are utilized as raw materials for the calcining processes of this invention is to mechanically blend them after they have been ground to the finely-divided state (preferably so that at least about 80 weight percent of the particles of each of the raw phosphatic materials can be passed through a U.S. standard 60-mesh screen). Other procedures for preparing fairly uniform calciner feed streams should now be readily apparent to those in the art, and can be utilized without detracting substantially from the benefits that can result from practicing this invention.

Any calcining equipment that has the ability to raise the temperature of the above-described "raw" materials (blends or mixtures of alkali metal sulfate with the appropriate alkali metal phosphate) to a temperature within the range of from 450° C. to about 600° C. can be used in the practice of this invention. Such calcining equipment is well known and readily available commercially, and need not be detailed herein.

One preferred embodiment of the present invention relates to overall processes for manufacturing the alkali metal sulfate-alkali metal trimetaphosphate compositions described hereinbefore directly from a mixture of sulfuric and phosphoric acids. Thus, it has been discovered that if one "neutralizes" a mixture of sulfuric and phosphoric acids containing from about 3.6 to about 74 (corresponding about 5 to 80 weight percent of sulfate in the product) and preferably from about 7.5 to about 52 (corresponding about 10 to 60 weight percent of alkali metal sulfate in the product), weight percent of sulfuric acid (based on the total combined weight of sulfuric and phosphoric acids in the mixture) with any desired alkali metal base, preferably an alkali metal hydroxide or an alkali metal carbonate) that will react with ("neutralize") these acids, until the pH of the resulting reaction product (measured at the 1 weight percent level of non-volatile "solids" in distilled water at about 25° C.) is between about 3.8 and about 5.1 (for the manufacture of one of the relatively "pure" binary sulfate-trimetaphosphate blends described above); or between about 5.2 and about 7.0 (for the manufacture of one of the quaternary sulfate-trimetaphosphate-tripolyphosphate-pyrophosphate blends described above), the desired "raw" material mixture for the above-described calcining step can readily be prepared. Thus, it has been found that by following these pH instructions, the materials that result (from reacting the alkali metal bases with the acidic mixtures) can be utilized directly in the calcining step of the present invention described heretofore.

In the following examples, which are illustrative of some of the embodiments of the present invention, all parts are by weight unless otherwise specified.

EXAMPLE I

Five hundred parts each of monosodium orthophosphate and anhydrous sodium sulfate are milled together in a conventional hammer mill to essentially a −100 mesh particle size. The resulting mixture is then introduced into a conventional direct gas-fixed, stainless steel, rotating drum calciner, where its temperature is raised at an average rate of about 20° C. per minute from room temperature to 525° C. At this point, a sample taken from the calciner shows the complete absence of IMP from the resulting product, and that about 97 weight percent of the phosphate in the resulting product is in the form of sodium trimetaphosphate.

By comparison, when 100 parts of −100 mesh monosodium orthophosphate are calcined in the same manner, the material is found to contain 55 weight percent of IMP when the temperature reaches 525° C.

Excessive severe caking of the material in the calciner is also observed during this test using relatively pure monosodium orthophosphate, whereas in Example I, above, no significant caking in the calciner is observed. This represents still another valuable advantage of the processes of the present invention over conventional calcining processes for manufacturing alkali metal trimetaphosphates.

EXAMPLE II

Into a conventional glass-lined reaction vessel fitted with a fairly efficient stirrer are introduced a mixture of acids containing 560 parts of water, 800 parts of $H_3PO_4$, and 200 parts of $H_2SO_4$. Into the resulting mixture are then introduced, over a period of about 45 minutes, 735 parts of sodium carbonate. After all of the sodium carbonate has been added, the pH of the aqueous material in the reaction vessel [measured at the 1 weight percent of "solids" (i.e., non-volatile at 100° C.) level in distilled water at 25° C.] is about 6.0. This material is in the physical form of a moderately viscous slurry. This slurry is then dried on a conventional steam-heated stainless steel drum drier, so that the resulting anhydrous product contains 60 weight percent of monosodium orthophosphate (MSP), 18 weight percent of disodium orthophosphate (DSP), and 22 weight percent of sodium sulfate.

The drum-dried MSP–DSP–sodium sulfate product is then calcined in an oven to a temperature of about 480° C. and held at this temperature for about 90 minutes, before it is cooled to room temperature. The product is a uniform blend of 46.9 weight percent sodium trimetaphosphate, 26.1 weight percent of sodium tripolyphosphate, 2.5 weight percent of tetrasodium pyrophosphate, and 24.5 weight percent of sodium sulfate.

When a blend containing similar proportions of MSP and DSP (as that illustrated in Example II), but no sodium sulfate, is calcined in an identical manner, the resulting product is found to contain 21.3 weight percent of IMP, 28.7 weight percent of sodium trimetaphosphate, and 25.6 weight percent of sodium tripolyphosphate. Surprisingly, the processes of the present invention can result in the complete absence of insoluble metaphosphates from the calcined product, even though, from experience prior to the present invention, one would expect that calcination of such an initial mixture of orthophosphates would result in the production of substantial quantities of this material. Another surprising result is that significantly larger quantities of sodium trimetaphosphate than would ordinarily be expected can be manufactured in this manner from phosphate "raw" materials having M/P ratios from slightly above 1 to about 1.7.

EXAMPLE III

A mixture of 30 parts of −100 mesh sodium tripolyphosphate, 60 parts of −100 mesh monosodium orthophosphate, and 40 parts of −100 mesh sodium sulfate is introduced into an indirectly heated, gas-fired rotary calciner. Then, over a period of about 30 minutes, while the calciner is slowly revolved, the temperature of the mixture is raised to about 480° C. The material in the calciner is maintained at this temperature for an additional 10 minutes, and then cooled quickly to room temperature. Analysis of the resulting product reveals it to be composed of 1.3% of tetrasodium pyrophosphate, 20.6% of penta sodium tripolyphosphate, 45.8% of sodium trimetaphosphate and 33.1% of sodium sulfate, and essentially no IMP.

In the foregoing examples, calcining temperatures of from about 480–530° C. were described. The calcining processes of this invention are not at all limited to this range, however. Generally, any calcining temperature which is sufficiently high to cause the conversion of the phosphatic fraction of the "raw" calciner materials of this invention into alkali metal trimetaphosphate, but which is below the melting point of any of the polyphosphate materials being produced in the calcining reaction, can be utilized successfully in the practice of the present invention. For consistently excellent results, for example, calcining temperatures of from about 400 to about 620° C. can be utilized. However, for optimum results, a calcining temperature of from about 430 to about 570° C. is preferred.

What is claimed is:

1. In a calcining process for the manufacture of an alkali metal trimetaphosphate composition wherein at least one inorganic, water soluble alkali metal phosphate salt is converted to said alkali metal trimetaphosphate at a temperature below the melting point of said trimetaphosphate, the improvement which comprises performing the conversion of said alkali metal phosphate salt to said alkali metal trimetaphosphate while said alkali metal phosphate salt is in contact with from about 2 to about 70% by weight of alkali metal sulfate based upon the total weight of said alkali metal phosphate and alkali metal sulfate.

2. A process as in claim 1, wherein the amount of said alkali metal sulfate is at least about 5 weight percent of the total weight of alkali metal phosphate salts initially introduced into said process.

3. A process as in claim 2, wherein said alkali metal is sodium.

4. A process as in claim 2, wherein said alkali metal is potassium.

5. A process for producing a product containing alkali metal trimetaphosphate which comprises calcining at a temperature below the melting point of said alkali metal trimetaphosphate a mixture containing inorganic, water soluble alkali metal phosphate salts and an alkali metal sulfate; at least one of said alkali metal phosphate salts containing some water of constitution, the overall ratio of M/P, wherein M is an alkali metal cation, of said alkali metal phosphate salts being between about 0.9 and about 1.5, and the weight ratio of said alkali metal sulfate to said alkali metal phosphate salts in said mixture being from about 1:50 to about 7:10, respectively.

6. A process as in claim 5, whereby the weight ratio of said alkali metal sulfate to said alkali metal phosphate salts is from about 1:10 to about 3:2, respectively.

7. A process for producing a product containing alkali metal trimetaphosphate which comprises calcining at a temperature below the melting point of said alkali metal trimetaphosphate a mixture containing inorganic, water soluble alkali metal phosphate salts and alkali metal sulfate; at least one of said alkali metal phosphate salts containing water of constitution, the overall ratio of M/P, wherein M is an alkali metal cation, of said alkali metal phosphate salts being between about 1.5 and about 1.7, and at least about 10 weight percent of said mixture being said alkali metal sulfate.

8. In a process for the manufacture of sodium trimetaphosphate, which process comprises calcining monosodium orthophosphate at a temperature below about 620° C. to convert said monosodium orthophosphate to sodium trimetaphosphate, the improvement which comprises calcining said monosodium orthophosphate while it is in intimate admixture with from about 5 to about 70 weight percent, based on the combined weight of the mixture, of sodium sulfate.

9. A process which comprises (a) reacting an alkali metal base with a mixture of phosphoric acid and sulfuric acid to thereby produce a reaction product having a pH, measured at the 1 weight percent level at 25° C. in distilled water between about 3.8 and about 7.0, and (b) calcining said reaction product at a temperature between about 400° C. and about 620° C. to thereby produce an alkali metal trimetaphosphate product; said mixture containing from about 3.6 to about 74 weight percent of said sulfuric acid.

10. A process as in claim 9, wherein said alkali metal is sodium and said alkali metal base is sodium carbonate.

References Cited

UNITED STATES PATENTS

| | | | |
|---|---|---|---|
| 2,365,190 | 12/1944 | Hatch | 252—135 |
| 2,788,328 | 4/1957 | Merget | 252—135 |
| 2,867,585 | 1/1959 | Vitale | 252—135 |
| 2,962,354 | 11/1960 | Edwards | 23—106 |
| 3,049,419 | 8/1962 | Raistrick | 23—106 X |
| 3,081,150 | 3/1963 | Beltz et al. | 23—106 |
| 3,230,040 | 1/1966 | Metcalf et al. | 23—106 |

LEON D. ROSDOL, *Primary Examiner.*

JULIUS GREENWALD, *Examiner.*

M. WEINBLATT, J. T. FEDIGAN, *Assistant Examiners.*